United States Patent [19]

Hild

[11] 4,248,340
[45] Feb. 3, 1981

[54] DETACHABLE CONVEYOR BUCKET

[76] Inventor: Danny L. Hild, P.O. Box 284, Tribune, Kans. 67879

[21] Appl. No.: 52,546

[22] Filed: Jun. 27, 1979

[51] Int. Cl.³ .......................................... B65G 17/36
[52] U.S. Cl. ................................ 198/711; 248/221.3
[58] Field of Search .................... 198/711, 712, 701; 248/221.3, 224.1, 225.1; 24/31 R, 230 R

[56] References Cited

U.S. PATENT DOCUMENTS

| 3,355,702 | 11/1967 | Mundschenk et al. ....... 248/221.3 X |
| 4,032,001 | 6/1977 | Hild ..................................... 198/711 |

*Primary Examiner*—Robert B. Reeves
*Assistant Examiner*—Douglas D. Watts
*Attorney, Agent, or Firm*—John H. Widdowson

[57] ABSTRACT

A conveyor bucket and bracket assembly in which the bucket is attachable and separable from the bracket without the use of screws, bolts or other fasteners.

6 Claims, 6 Drawing Figures

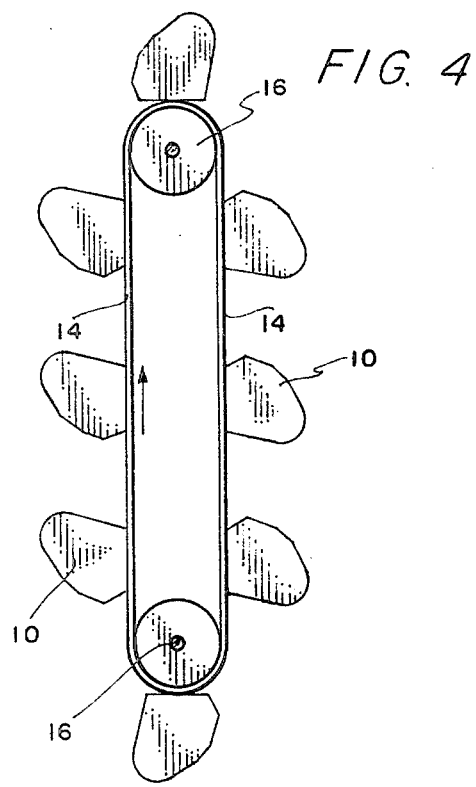
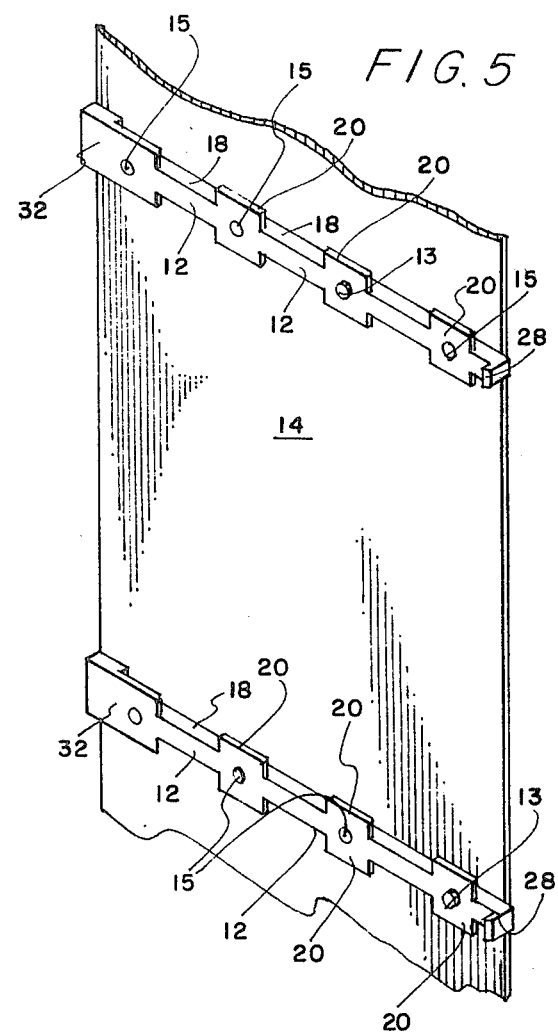
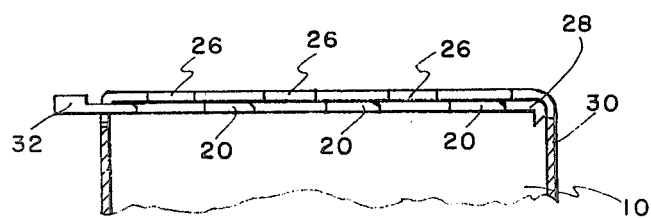

DETACHABLE CONVEYOR BUCKET

BACKGROUND OF THE INVENTION

1. Field of the Invention

This invention provides a conveyor bucket and bracket assembly. More specifically, this invention provides an improved detachable conveyor bucket, separable from a bracket assembly without the use of screws, bolts or the like.

2. Description of the Prior Art

In my U.S. Pat. No. 4,032,001 which will be incorporated by reference, I invented a detachable conveyor bucket and bracket assembly which utilized a pin, or the like, for fastening the bucket to the bracket assembly. This invention has many deficiencies over my improved detachable conveyor bucket.

SUMMARY OF THE INVENTION

It is therefore an object of this invention to provide an improved conveyor bucket and bracket assembly which are easier removed from each other than that in my U.S. Pat. No. 4,032,001.

It is another object of this invenion to provide an improved conveyor bucket and bracket assembly which slide together and are not bolted on the locking area.

Broadly, this invention provides a conveyor bucket and bracket assembly in which the bucket is attachable and separable from the bracket without the use of screws, bolts or other fasteners comprising an elongated bracket member defining a slide and a first set of lugs; a cooperating bucket having a side wall formed with an elongated opening, said opening having a notched periphery defining a second set of lugs; said bucket being movable relative to said slide whereby the first set of lugs cooperate with said second set of lugs to removably interlock the bracket and the bucket; and said slide being formed with a latch operable to engage a second wall of said bucket to removably retain the bucket fixed relative to the slide.

BRIEF DESCRIPTION OF THE DRAWINGS

FIG. 4 is a side view of a grain elevator with an endless conveyor belt and grain buckets attached thereto;

FIG. 5 is a front sectional view of the conveyor belt with the brackets mounted to the belt; and FIG. 6 is a partial horizontal sectional view of the detachable bucket and bracket illustrating the bucket being slid on the bracket but unlocked therewith.

DETAILED DESCRIPTION OF THE INVENTION

Figure 1:
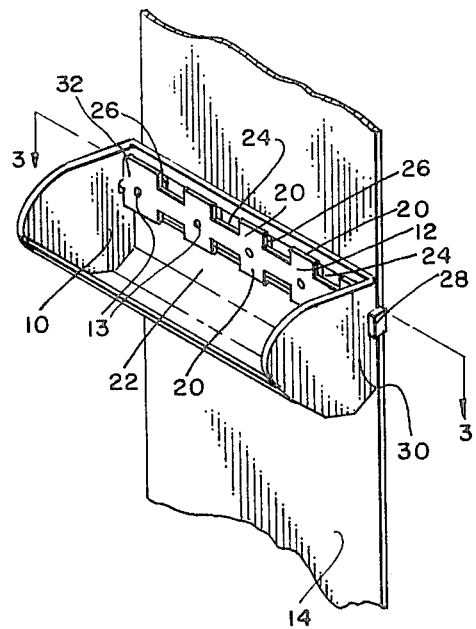
FIG. 1 is a perspective view of the detachable conveyor bucket and bracket assembly.

Now referring in detail now to the drawings, wherein identical reference numerals represent like parts, there is seen a conveyor bucket 10 and bracket assembly 12 in which the bucket 10 is attachable and separable from the bracket 12 without the use of screws, bolts or the like. Bracket 12 is elongated, attached by bolts 13 in a plurality of apertures 15 to conveyor belt 14 being driven by conveyors 16, and has a structure defining a slide 18 and a first set of lugs 20.

Bucket 10 has a side wall 22 formed with an elongated opening 24 which has a notched periphery defining a second set of lugs 26. Bucket 10 is movable relative to the slide 18, whereby the first set of lugs 20 cooperate with the second set of lugs 26 to removably interlock the bracket 12 and the bucket 10. The slide 18 is formed an integral, resiliently movable latch 28 on one end thereof to frictionally engage a wall 30 of the bucket 10 to removably retain the bucket 10 fixed relative to the slide 18. The other end of the bracket 12 has a structure defining a T-shaped locking lug 32.

Figure 2:
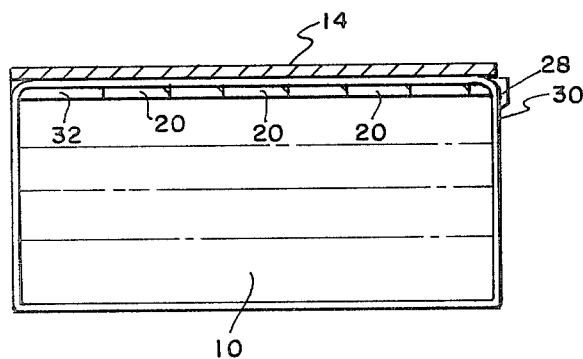
FIG. 2 is a top plan view of the detachable conveyor bucket and bracket assembly with the conveyor belt illustrated in horizontal cross section.
Figure 3:
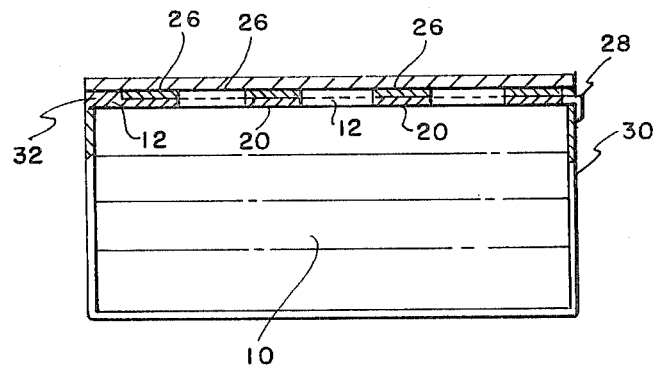
FIG. 3 is a horizontal sectional view taken along the plane of line 3—3 in FIG. 1.

With continuing reference to the drawings for operation of the invention, latch 28 is initially inserted in the elongated opening 24 of bucket 10 and second set of lugs 26 of bucket 10 slide along slide 18 of bracket 12 until latch 28 is flushed against wall 30 of bucket 10, as shown in FIG. 6. Latch 28 is resilient and by continuing to slide lugs 26 of bucket 10 along the slide 18 of bracket 12, this time with more sliding force, latch 28 will bend until it snaps around wall 30 of bucket 10 to frictionally engage the same, as illustrated in FIGS. 1, 2 and 3.

Changes may be made in the construction and arrangement of the parts or elements of the embodiments as disclosed herein without departing from the spirit or scope of the invention as defined in the following claims.

I claim:

1. A conveyor bucket and bracket assembly in which the bucket is attachable and separable from the bracket without the use of screws, bolts or other fasteners comprising an elongated bracket member defining a slide and a first set of lugs;

a cooperating bucket having a first wall, a second wall, and a side wall formed with an elongated opening, said opening having a notched periphery defining a second set of lugs;

said bucket being movable relative to said slide whereby the first set of lugs cooperate with said second set of lugs to removably interlock the bracket and the bucket;

said slide being formed with a latch operable to engage said second wall of said bucket to removably retain the bucket fixed relative to the slide;

said slide additionally being formed integrally with a generally T-shaped locking lug at a second end thereof, said locking lug flushing against one of the slide lugs to cooperate with said latch in removably retaining the bucket fixed relative to said slide.

2. The device of claim 1 wherein the latch is formed integral with the slide.

3. The device of claim 2 in which the latch is at a first end of said slide.

4. The device of claim 3 in which the latch is resiliently movable relative to said slide and bucket and operative to frictionally engage said bucket.

5. The device of claim 4 wherein said latch engages said second wall of said bucket.

6. The device of claim 5 wherein the slide is formed with a plurality of apertures for receiving fasteners to secure the slide to a conveyor means.

* * * * *